United States Patent [19]

Silvestri

[11] 4,312,247
[45] Jan. 26, 1982

[54] VIBRATION REDUCING MOUNT SYSTEM

[76] Inventor: Giovanni J. Silvestri, 4 Meadowbrook Dr., Barrington, R.I. 02806

[21] Appl. No.: 798,058

[22] Filed: May 18, 1977

[51] Int. Cl.³ .................. F16F 15/22; F16D 3/17; F16D 3/28
[52] U.S. Cl. .................. 74/574; 64/1 V; 64/11 R
[58] Field of Search ............ 64/1 V, 11 R, 27 NM; 74/574; 248/15, 18; 310/51; 73/522, 526

[56] References Cited

U.S. PATENT DOCUMENTS

| | | | |
|---|---|---|---|
| 1,734,043 | 11/1929 | Nelson | 64/14 |
| 1,792,093 | 2/1931 | Holmes | 74/750 R |
| 1,831,628 | 11/1931 | Kuenzel | 248/9 |
| 2,311,856 | 2/1943 | Newell | 74/574 X |
| 2,449,654 | 9/1948 | Jessop | 64/27 NM X |
| 2,514,051 | 7/1950 | Gredell | 64/27 NM X |
| 2,595,942 | 5/1952 | Hasbrouck | 74/801 X |
| 3,243,154 | 3/1966 | Holmes et al. | 248/358 AA |
| 3,313,125 | 4/1967 | Hein | 64/27 NM |
| 3,513,715 | 5/1970 | Whitfield | 74/801 X |
| 4,011,021 | 3/1977 | Hartz | 64/1 V X |
| 4,070,923 | 1/1978 | Benthake | 74/411 |

FOREIGN PATENT DOCUMENTS

| | | | |
|---|---|---|---|
| 632982 | 2/1962 | Italy | 74/801 |
| 441155 | 1/1936 | United Kingdom | 74/574 |
| 1400765 | 7/1975 | United Kingdom | 64/27 |

Primary Examiner—Leslie Braun
Attorney, Agent, or Firm—Robert F. Beers; Arthur A. McGill

[57] ABSTRACT

A vibration reducing mount system for supporting a rotary machine symmetrically about its center of rotation. The mount system comprises an annular ring bonded between two annular plates. One of the annular plates is bolted to the supported machine and the other annular plate is referenced to ground. Shock absorbers with adjustable damping constants are tied across from one annular plate to the other annular plate to dampen the torsional vibrations of the annular plate bolted to the supported machine relative to the one referenced to ground.

5 Claims, 3 Drawing Figures

VIBRATION REDUCING MOUNT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This patent application is co-pending with my eight other patent applications having Ser. Nos. 798,059; 798,060; 798,061; 798,062; 798,063; 798,064; 798,065 and 798,066 now U.S. Pat. No. 4,187,740 and having the same filing date of May 18, 1977 related to a high pressure air turbine-gear train assembly describing and claiming various aspects thereof.

This invention relates to a vibration attenuating mount system, and more particularly to a system for reducing vibrational energy, displacements and forces transmitted from a gear train casing to a supporting structure thereof.

It has been common in industry to employ vibration isolation or spring-like support systems to reduce the transmission of vibrational energy from its source to the supporting structure. These support systems have taken many forms using rubber in shear and/or compression, all-metal materials similar to steel wool in confinement, and springs. The support systems take different configurations suitable for particular applications. The mechanics of these isolation attempts is to support the element generating the disturbing force or the element to be protected from the vibration forces so that its natural frequency on its support member is less than about 70 percent of the disturbing frequency and at the same time provides damping to the extent needed to reduce its response while going through its natural frequency during a transient. Furthermore, the isolation mount system must also transfer steady state loads to its ground reference. This results, in case of extremely high loads, in rather stiff mounts and low attenuation. Furthermore, in case of machines operating at high power and which are of low weight and where high torsional loads are experienced, it is desirable that the mounting system must also satisfy the requirement that it be small, soft, strong and support the unit symmetrically about its center of rotation.

SUMMARY OF THE INVENTION

The vibration reducing mount system for supporting a rotary machine such as a gear train symmetrically about its center of rotation includes an annular ring bonded between two annular plates. One of the annular plates is bolted to the supported machine and the other annular plate is referenced to ground. Shock absorbers with their adjustable damping constants are tied transversely across one annular plate to the other annular plate so as to dampen the torsional vibration of the annular plate bolted to the supported machine relative to the one referenced to ground.

An object of subject invention is to provide a mount system which permits supporting of a rotary machine symmetrically about its center of rotation on vibration mount capable of transmitting high torques in steady state.

Another object of subject invention is to allow torsional excursion of the supported machine without lateral displacement of its center line.

Still another object of subject invention is to have a vibration reducing mount system which transmits high torque with rubber in shear at low shear stress by virtue of the high shear area provided.

Still another object of subject invention is to provide a vibration reducing mount system which provides lateral excursion, when experienced, to result in low shear stress for high loads.

Other objects, advantages and novel features of this invention will become apparent from the following detailed description of the invention when considered in conjunction with the accompanying drawings wherein:

DESCRIPTION OF A PREFERRED EMBODIMENT

Figure 1:
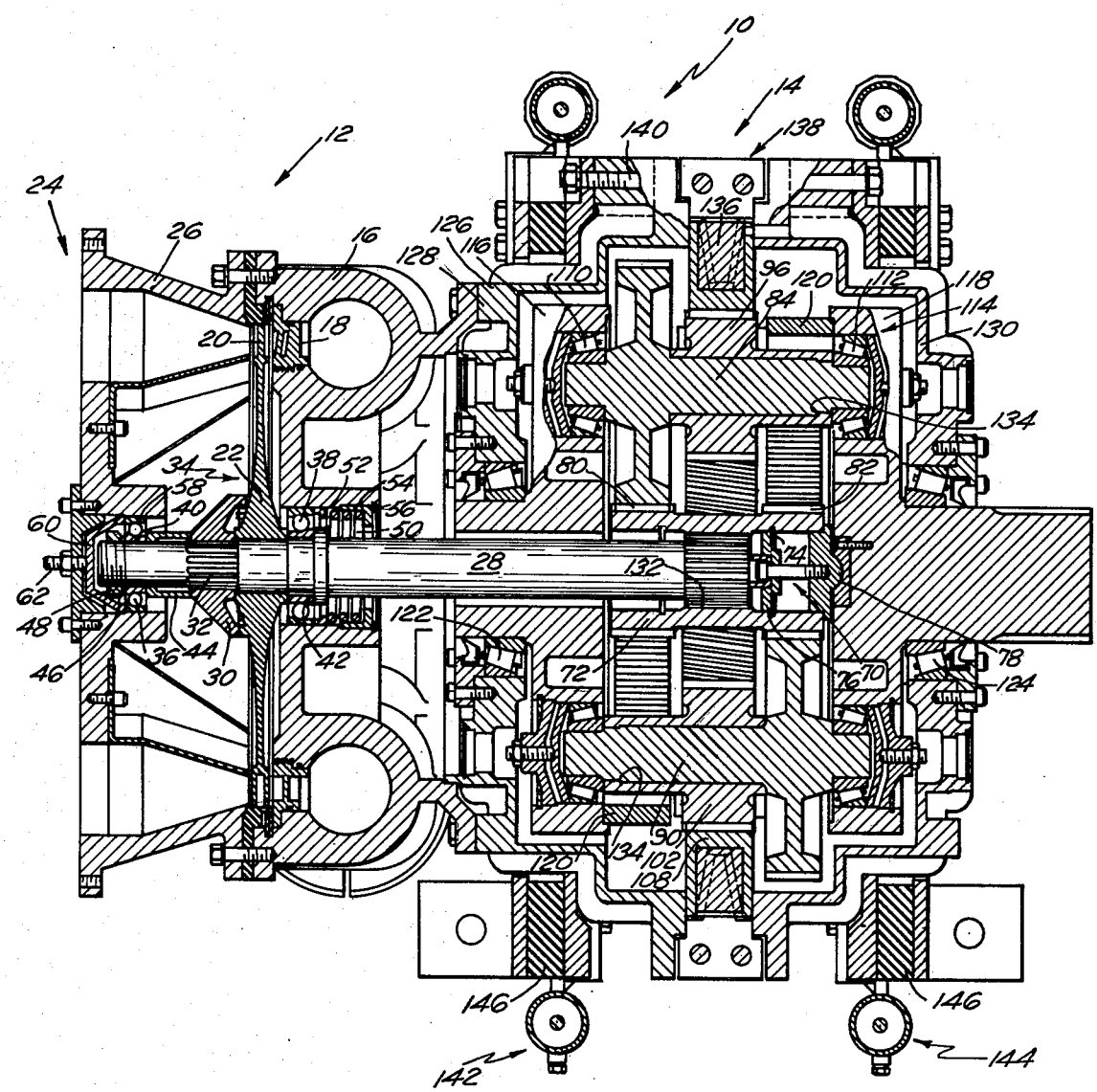
FIG. 1 is a multi-cross sectional view of a high pressure air turbine-gear train system built according to the teachings of subject invention.
Figures 2, 3:
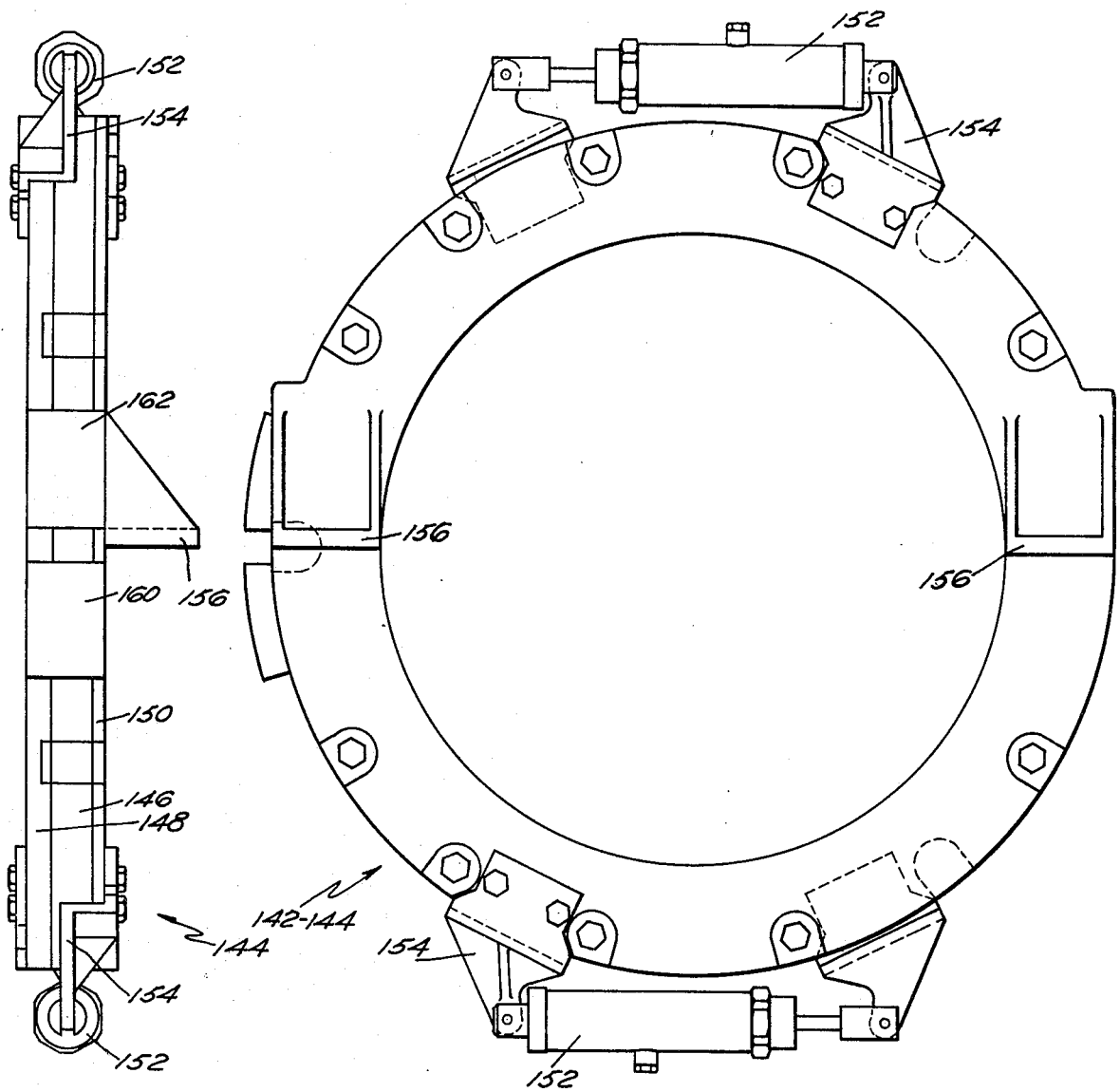
FIG. 2 is an end view of the mount system without the gear train assembly therein.
FIG. 3 is an end view of FIG. 2.

Referring to the drawings wherein like reference characters designate like parts throughout the several views, and more particularly to FIG. 1 thereof, a multi-cross sectional view of a high pressure air turbine-gear train assembly using a vibration reducing mount system according to the teachings of subject invention is shown. As shown in FIGS. 1, 2 and 3, the mount system includes two similar mounts 142 and 144. Mount 144 is made of elements such as items 146, 148, 150, 152, 154 and 156. As can be seen from FIGS. 2 and 3, element 146 is an annular rubber ring bonded between and to plates 148 and 150. Elements 148 and 150 are metallic annular plates. Plate 148 is bolted to the engine or supported machinery and plate 150 is bolted and referenced to ground via element 156 as shown in FIG. 3. Element 152 is a shock absorber or damper with adjustable damping constants which ties across from annular plate 148 to annular plate 150 for damping torsional vibrations of plate 148 relative to plate 150 about the center of the assembly. Elements 160 and 162 as shown in FIGS. 2 and 3 are respectively welded to annular plates 148 and 150 and serve to limit the torsional excursion of plates 148 relative to 150.

In operation, this system permits support of a rotary machine symmetrically about its center of rotation on vibration mounts capable of transmitting steady state torques up to 25,000 foot-pounds at a minimum weight and size. Furthermore, it allows torsional excursion without lateral displacement of its center line due to the symmetry of the design. It also transmits the high torques up to 25,000 foot-pounds through rubber in shear at low shear stress by virtue of the high shear area provided. It also provides lateral excursion under the influence of shock load when the machine is not turning.

Briefly stated, vibration reducing mount system supports a rotary machine symmetrically about its center of rotation. The system includes an annular ring bonded between two annular plates, one of the annular plates is bolted to the supporting machine and the other annular plate is referenced to ground. Shock absorbers with adjustable damping constants are tied across from one annular plate to the other annular plate to dampen the torsional vibration of the annular plate bolted to the supporting machine relative to the one referenced to ground.

Obviously, many modifications and variations of the present invention are possible in the light of the above teachings. As an example, the material used in fabricating different elements of the system can be varied without any deviation from the teachings of subject invention. Furthermore, stress mode other than shear for vibration isolation can be used. It is therefore understood that within the scope of the appended claims, the invention may be practiced otherwise than as specifically described.

I claim:

1. A vibration reducing mount system for supporting a rotary machine about its center of rotation comprising:
   a first annular plate having a first face thereof detachably secured to the rotary machine;
   a second annular plate having a first face thereof detachably secured to ground;
   a flexible annular ring having a first face thereof attached to a second face of said first annular plate and a second face thereof attached to a second face of said second annular plate; and
   damping means being applied transversely across said first annular plate and said second annular plate whereby torsional vibrations of said first annular plate relative to said second annular plate are damped.

2. The mount system of claim 1 wherein said flexible annular ring is made of an elastomeric material.

3. The mount system of claim 1 wherein said damping means includes a pair of shock absorbers, said shock absorbers being symmetrically mounted across said first annular plate and said second annular plate.

4. The mount system of claim 3 wherein said pair of shock absorbers have adjustable damping constants.

5. The mount system of claim 4 which further includes a pair of stops being attached to said first and second annular plates for limiting axial motion of the rotary machine.

* * * * *